United States Patent
Taniguchi et al.

(10) Patent No.: US 6,805,735 B2
(45) Date of Patent: Oct. 19, 2004

(54) WATER BASE INK FOR INK-JET RECORDING

(75) Inventors: Akihiko Taniguchi, Nagoya (JP); Masashi Tsuda, Harguri-gun (JP); Shunichi Higashiyama, Yotsukaichi (JP); Masaya Fujioka, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/251,304

(22) Filed: Sep. 19, 2002

(65) Prior Publication Data
US 2003/0089272 A1 May 15, 2003

(30) Foreign Application Priority Data
Sep. 19, 2001 (JP) .......................... 2001-285173

(51) Int. Cl.[7] .......................... C09D 11/00; G01D 11/00
(52) U.S. Cl. ........................ 106/31.13; 106/31.27; 106/31.6; 347/100
(58) Field of Search .................. 106/31.13, 31.27, 106/31.6; 347/100

(56) References Cited

U.S. PATENT DOCUMENTS

| | | | |
|---|---|---|---|
| 5,560,771 A | * 10/1996 | Takemoto et al. | 106/31.49 |
| 5,948,154 A | * 9/1999 | Hayashi et al. | 106/31.48 |
| 6,070,958 A | * 6/2000 | Kanome | 347/7 |
| 6,440,203 B2 | * 8/2002 | Kato | 106/31.6 |
| 6,514,330 B1 | * 2/2003 | Kanaya et al. | 106/31.49 |
| 6,562,117 B2 | * 5/2003 | Sano et al. | 106/31.6 |

FOREIGN PATENT DOCUMENTS

| | | | |
|---|---|---|---|
| EP | 1 010 736 A1 | 6/2000 | |
| EP | 1 038 929 A1 | 9/2000 | |
| EP | 1 038 930 A1 | 9/2000 | |
| EP | 1 099 731 A2 | 5/2001 | |
| EP | 001114851 A1 | * 7/2001 | C09D/11/00 |
| EP | 1 127 927 A2 | 8/2001 | |

* cited by examiner

Primary Examiner—Mark L. Bell
Assistant Examiner—Veronica F. Faison
(74) Attorney, Agent, or Firm—Reed Smith LLP

(57) ABSTRACT

An ink for ink-jet recording is provided, in which an amount of water X (% by weight) in the ink and a saturation viscosity Y satisfy $Y \leq 4.5e^{0.09X}$. The saturation viscosity Y is a viscosity (mPa·s) obtained when an ink residual liquid, which is obtained by evaporating volatile components of the ink until a change in weight of the ink is less than 0.05 g/day per 50 g of ink under a condition of a temperature of 60° C. and a humidity of 40%, is cooled to a temperature of 25° C. in an environment of a humidity of 40%. X satisfies $50 \leq X \leq 75$. The ink exhibits satisfactory jetting stability when the ink is normally used. Further, the ink is easily restored to give a normal jetting state even after undergoing an abnormal condition, for example, when the ink is left to stand without any nozzle cap.

7 Claims, 4 Drawing Sheets

AMOUNT OF WATER AND SATURATION VISCOSITY

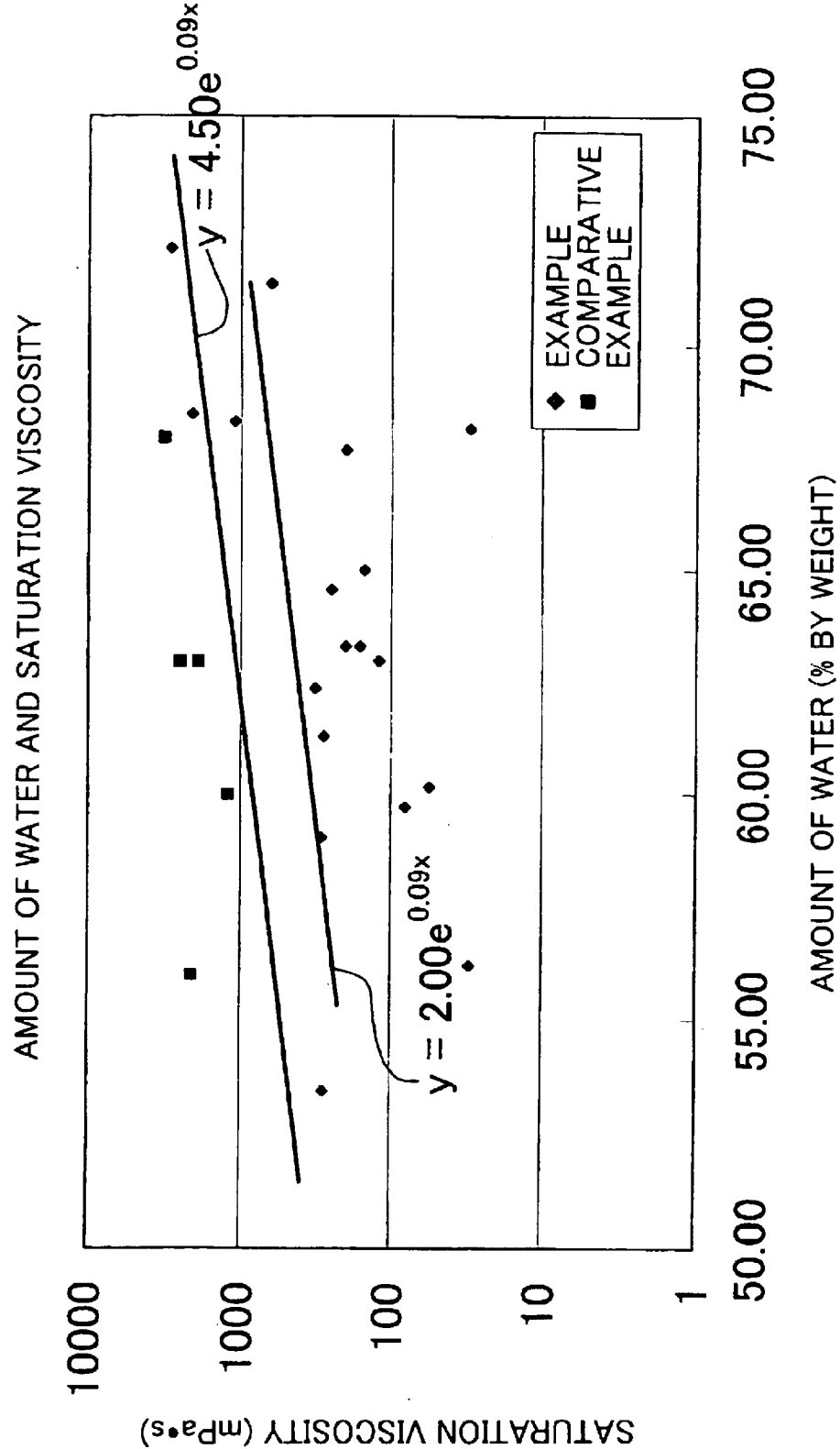

WATER BASE INK FOR INK-JET RECORDING

BACKGROUND OF THE INVENTION

Field of the Invention

The present invention relates to a water base ink for ink-jet recording.

Description of the Related Art

In the ink-jet recording, ink droplets are formed by using the ink discharge method including, for example, the electrostatic attraction method, a method in which mechanical vibration or displacement is applied to the ink by using a piezoelectric element, and a method in which bubbles are generated by heating the ink to utilize the pressure generated thereby, and all or a part of the ink droplets are adhered to a recording medium such as paper.

In recent years, the ink-jet recording method rapidly comes into widespread use, because the ink-jet recording method involves, for example, neither development process nor fixation process, and it is easy to effect the color printing. Nowadays, the high-definition printing and the high speed printing are rapidly advanced and realized by using the ink-jet printer. Further, for example, the color printer, which is capable printing on regular paper, is dominantly used.

In such a situation, high performance is required for the ink for ink-jet recording to be used for the ink-jet recording method as well. For example, the following performance is required. That is, the stable jetting operation can be performed without causing any clog-up at the tip of the head of the ink-jet printer and in the ink flow passage. A recorded image is given, in which the color tone is vivid and the density is sufficiently high.

In general, the ink, which is used for the ink-jet recording method, is roughly classified into the oil base ink and the water base ink. In the case of the oil base ink, the wettability is satisfactory with respect to the inner wall of the head of the ink-jet printer, and it is possible to perform the stable jetting operation. However, the oil base ink involves problems concerning odor and toxicity. At present, the water base ink is dominantly used.

In the case of the ink-jet printer which uses the general water base ink, the viscosity of the ink, at which the jetting operation can be normally performed, is about 1 to 10 mPa·s. However, when the volatile components such as water in the ink are evaporated, then the viscosity of the ink is increased at the nozzle tip of the ink-jet head, and the ink is consequently dried-up. As a result, the nozzle is clogged in some cases, and/or the jetting direction is deflected in other cases. In order to avoid the inconveniences as described above, a method is generally adopted, in which the jetting orifice of the head is covered with a nozzle cap in a tightly closed state during the period in which the jetting operation is not performed. This method functions sufficiently effectively under the ordinary condition of use.

However, when the ink is left to stand without effecting any tight closure with the nozzle cap or the like for several days or for a long period of time longer than the above in a state in which the nozzle disposed at the head tip of the ink-jet printer is filled with the ink, the ink, which is located on the nozzle surface, undergoes considerable increase in viscosity caused by the evaporation of the volatile components. In the worst case, any deposit appears, and the ink is consequently dried-up. As for the ink having been in the state of the increase in viscosity, the appearance of deposition, and the occurrence of drying-up as described above, it has been almost impossible that the ink is restored to give the normal state by means of a conventionally known purge device in which the ink is forcibly discharged from the ink-jet head by using a pump or the like.

SUMMARY OF THE INVENTION

The present invention has been made in order to solve the problem as described above, an object of which is to provide a water base ink for ink-jet recording which exhibits satisfactory jetting stability during the normal use and which is easily restored to give a normal jetting state even under an abnormal condition in which the ink is left to stand without any nozzle cap, and an ink-jet recording apparatus which accommodates the ink.

As a result of diligent investigations performed by the present inventors in order to achieve the object as described above, the present inventors have empirically found out that the nozzle restoration performance is satisfactory when the amount of water in an ink and the saturation viscosity satisfy a certain relationship for the ink prepared by combining a variety of constitutive components and compositions. Thus, the present invention has been achieved.

According to a first aspect of the present invention, there is provided an ink for ink-jet recording, which contains water, wherein an amount of water X (% by weight) in the ink and a saturation viscosity Y satisfy the following expression (1):

$$Y \leq 4.5 e^{0.09X} \tag{1}$$

wherein the saturation viscosity Y is a viscosity (mPa·s) obtained when an ink residual liquid, which is obtained by evaporating volatile components of the ink until a change in weight of the ink is less than 0.05 g/day per 50 g of ink under a condition of a temperature of 60° C. and a humidity of 40%, is cooled to a temperature of 25° C. in an environment of a humidity of 40%, and X satisfies $50 \leq X \leq 75$.

In the water base ink for the ink-jet recording according to the first aspect of the present invention, the amount of water X in the ink and the saturation viscosity Y satisfy the relationship represented by the foregoing expression (1). Accordingly, the water base ink for ink-jet recording exhibits satisfactory jetting stability during the ordinary use. Further, the water base ink is easily restored to give a normal jetting state even under an abnormal condition, for example, when the ink is left to stand without any nozzle cap. If a water base ink for ink-jet recording, which does not satisfy the relationship represented by the foregoing expression (1), is used, it is impossible to make restoration to the normal state with a purge device, when the viscosity is once extremely increased, when any deposit appears, or when the ink is dried up, as a result of the evaporation of volatile components of the ink disposed on the nozzle surface. In the present invention, for example, taking the stable discharge and the durability into consideration, it is preferable that the saturation viscosity Y satisfies the following expression (2):

$$Y \leq 2.0 e^{0.09X} \tag{2}$$

The ink may further comprise a water-soluble organic solvent and a coloring agent. The amount of water in the ink may be 55 to 73% by weight. The ink may contain a water-soluble organic solvent by 10 to 45% by weight and a coloring agent by 0.1 to 5.5% by weight.

According to a second aspect of the present invention, there is provided an ink-jet recording apparatus comprising an ink-jet head; an ink tank which accommodates an ink to be supplied to the ink-jet head; and the ink according to the first aspect of the present invention which is accommodated in the ink tank. The ink tank may be a replaceable ink cartridge or an ink container which is fixedly provided in the ink-jet recording apparatus.

BRIEF DESCRIPTION OF THE DRAWINGS

An embodiment of the invention will be described in detail with reference to the following figures wherein:

FIG. 4 shows the relationship between the amount of water and the saturation viscosity concerning inks prepared in Examples.

DESCRIPTION OF THE PREFERRED EMBODIMENTS

Figure 1:
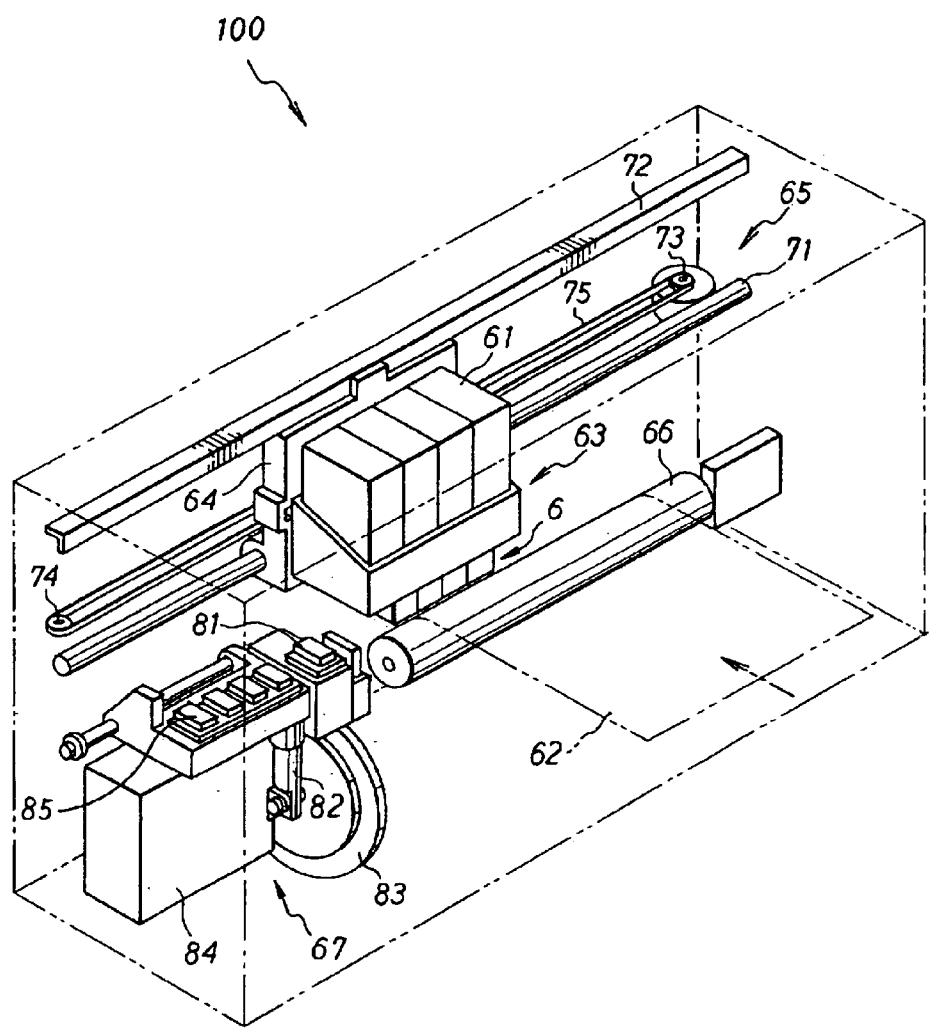
FIG. 1 is a perspective view showing a color ink-jet printer having an ink cartridge which contains color ink set prepared in examples of the invention.

The water base ink for ink-jet recording of the present invention contains at least water, a water-soluble organic solvent which serves, for example, as a moistening agent or a permeating agent, and a coloring agent. As for the water, it is preferable to use, for example, pure water or distilled water which is generally used for the ink for ink-jet recording in which the content of cationic ion and anionic ion is small.

The amount of water of the water base ink for ink-jet recording of the present invention is preferably 50 to 75% by weight of the total amount of the water base ink for ink-jet recording. If the amount of water is less than 50% by weight, then an obtained ink is blurred when the printing is performed on the paper in some cases, or the ink is hardly introduced into the nozzle in other cases. If the amount of water exceeds 75% by weight, then an obtained ink has an excessively high viscosity after volatile components are evaporated, and the nozzle restoration performance is lost in some cases. More preferably, the amount of water is 55 to 73% by weight.

The water-soluble organic solvent is principally used in order to avoid the appearance of deposit from the ink at the tip of the ink-jet head and avoid the drying-up. In order to allow the water base ink for ink-jet recording to satisfy the relationship represented by the foregoing expression (1) or (2), it is important to select the type and the amount of the water-soluble organic solvent. It is preferable to select the water-soluble organic solvent which has low volatility and which has high dye-dissolving ability.

The water-soluble organic solvent may include those which are generally referred to as "moistening agent" or "permeating agent". Specifically, for example, there may be exemplified polyalkylene glycols such as polyethylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol; alkylene glycol ethers such as diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether; glycerol; and pyrrolidones such as 2-pyrrolidone and N-methyl-2-pyrrolidone. The water-soluble organic solvent may be used singly. Alternatively, two or more species of the water-soluble organic solvents may be used in combination.

The content of the water-soluble organic solvent is preferably 10 to 45% by weight with respect to the total amount of the water base ink for ink-jet recording. If the content is less than 10% by weight, then the moistening action is insufficient, and problems of deposition and drying-up are caused in some cases. If the content exceeds 45% by weight, then the viscosity of an obtained ink is unnecessarily increased, the ink cannot be jetted, and the ink is dried extremely slowly on the recording paper. More preferably, the content is 15 to 40% by weight.

Those usable as the coloring agent include pigments and dyes which are generally used for the ink for ink-jet recording. The pigment may be any one of the inorganic pigment and the organic pigment. The extender pigment may be used in combination with them, if necessary. The inorganic pigment may include, for example, carbon black, metal oxide, metal sulfide, and metal chloride. Especially, in the case of the black water base ink, it is preferable to use carbon black.

The carbon black is not specifically limited, which may include, for example, Furnace Black, Lamp Black, Acetylene Black, and Channel Black. Among them, those commercially available may include, for example, Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (all produced by Columbia); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Valcan XC-72R (all produced by Cabot); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all produced by Degussa); and No. 25, No. 33, No. 40, No. 47, No. 52, No. 900, No. 2300, MCF-88, MA 600, MA 7, MA 8, and MA 100 (all produced by Mitsubishi Chemical Corporation).

The organic pigment may include, for example, azo pigment, diazo pigment, phthalocyanine pigment, quinacridone pigment, isoindolinone pigment, imidazolone pigment, dioxazine pigment, perylene pigment, perynone pigment, thioindigo pigment, anthraquinone pigment, and quinophthalone pigment. The extender pigment may include, for example, silica, calcium carbonate, and talc. Among them, those commercially available may include, for example, Toluidine Red, Toluidine Marron, Hansa Yellow, Benzidine Yellow, Pyrazolone Red, Lithol Red, Helio Bordeaux, Pigment Scarlet, Permanent Red 2B, Alizarin, Indanthrone, Thioindigo Marron, Phthalocyanine Blue, Phthalocyanine Green, Quinacridone Red, Quinacridone Magenta, Perylene Red, Perylene Scarlet, Isoindolinone Yellow, Isoindolinone orange, Benzimidazolone Yellow, Benzimidazolone Orange, and Benzimidazolone Red. The pigment as described above is used while adding a dispersing agent or the like in many cases. However, in order to improve the dispersion stability in water, it is also possible to use a self-dispersing type pigment having a surface treated with hydrophilic group.

Those generally usable as the dye described above include water-soluble cationic or anionic dyes including, for example, basic dyes, acidic dyes, direct dyes, and reactive dyes. Disperse dyes or oil-soluble dyes having no solubility in water may be also usable provided that they are substances capable of being stably dispersed in the ink. Those commercially available as the water-soluble dye may include, for example, Color Index No. Basic Red 1, 1:1, 2, 12, 13, 14, 18, 22, 27, 28, 29, 34, 38, 39, 46, 46:1, 67, 69, 70; Color Index No. Basic Violet 1, 2, 3, 4, 5, 7, 8, 10, 11, 11:1, 20, 33; Color Index No. Basic Blue 3, 6, 7, 9, 11, 12, 16, 17, 24, 26, 41, 47, 66; Color Index No. Basic Green 1, 4, 5; Color Index No. Basic Yellow 1, 11, 19, 21, 24, 25, 28, 29, 36, 45, 51, 67, 73; Color Index No. Basic Orange 14., 21, 22, 32; Color Index No. Basic Brown 1, 4; Color Index No. Direct Black 17, 19, 32, 51, 71, 108, 146, 154, 168; Color Index No. Direct Blue 6, 22, 25, 71, 86, 90, 106, 199; Color Index No. Direct Red 1, 4, 17, 28, 83, 227; Color Index No. Direct Yellow 12, 24, 26, 86, 98, 132, 142; Color Index No. Direct Orange 34, 39, 44, 46, 60; Color Index No. Direct Violet 47, 48, 107; Color Index No. Direct Brown 109; Color Index No. Direct Green 59; Color Index No. Acid Black 2, 7, 24, 26, 31, 52, 63, 112, 118; Color Index No. Acid Blue 9, 22, 40, 59, 93, 102, 104, 113, 117, 120, 167, 229, 234; Color Index No. Acid Red 1, 6, 32, 37, 51, 52, 80, 85, 87, 92, 94, 115, 181, 256, 289, 315, 317; Color Index No. Acid Yellow 11, 17, 23, 25, 29, 42, 61, 71; Color Index No. Acid Orange 7, 19; Color Index No. Acid Violet 49; Color Index No. Food Black 1, 2; and Color Index No. Reactive Red 180. Two or more species of the water-soluble dyes may be used in a mixed manner. In this case, it is possible to obtain a desired color which cannot be obtained even when the water-soluble dye is used singly.

The content of the coloring agent is determined so that the expression (1), preferably the expression (2) is satisfied. Further, the content of the coloring agent is determined depending on the desired color and the density. However, the content of the coloring agent is preferably 0.01 to 7% by weight and more preferably 0.1 to 5.5% by weight with respect to the total amount of the water base ink for ink-jet recording.

A dispersing agent and a necessary additive depending on the desired object may be mixed with the pigment or the disperse dye, and the pigment or the disperse dye may be dispersed in the ink by using a dispersing machine. For example, a ball mill, a sand mill, a line mill, and a high pressure homogenizer, which are conventionally known, may be used as the dispersing machine.

The dispersing agent may include, for example, high molecular weight dispersing agents and surfactants. Any one of cationic surfactants, anionic surfactants, amphoteric surfactants, and nonionic surfactants may be used as the surfactant.

The cationic surfactant may include, for example, aliphatic amine salt, aliphatic quaternary ammonium salt, benzalkonium salt, benzethonium chloride, pyridinium salt, and imidazolinium salt. The anionic surfactant may include, for example, fatty acid soap, N-acyl-N-methylglycine salt, N-acyl-N-methyl-α-alanine salt, N-acylglutamic acid salt, acylated peptide, alkylsulfonic acid salt, alkylbenzenesulfonic acid salt, alkylnaphthalenesulfonic acid salt, dialkylsulfosuccinic acid ester salt, alkylsulfoacetic acid salt, α-olefinsulfonic acid salt, N-acyl methyltaurine, sulfated oil, higher alcohol sulfuric acid ester salt, secondary higher alcohol sulfuric acid ester salt, alkyl ether sulfuric acid salt, secondary higher alcohol ethoxy sulfate, polyoxyethylene alkyl phenyl ether sulfuric acid salt, monoglysulfate, fatty acid alkylol amide sulfuric acid ester salt, alkyl ether phosphoric acid ester salt, and alkyl phosphoric acid ester salt.

The amphoteric surfactant may include, for example, those of the carboxybetaine type, those of the sulfobetaine type, aminocarboxylic acid salt, and imidazolinium betaine. The nonionic surfactant may include, for example, polyoxyethylene secondary alcohol ether, polyoxyethylene alkyl phenyl ether, polyoxyethylene sterol ether, polyoxyethylene lanoline derivative, polyoxyethylene polyoxypropylene alkyl ether, polyoxyethylene glycerol fatty acid ester, polyoxyethylene castor oil, hardened castor oil, polyoxyethylene sorbitol fatty acid ester, polyethylene glycol fatty acid ester, fatty acid monoglyceride, polyglycerol fatty acid ester, sorbitan fatty acid ester, propylene glycol fatty acid ester, sucrose fatty acid ester, fatty acid alkanolamide, polyoxyethylene fatty acid amide, polyoxyethylene alkylamine, alkylamine oxide, acetylene glycol, and acetylene alcohol.

The water base ink for ink-jet recording of the present invention may be further added with, for example, a pH-adjusting agent, a metal-sequestering agent, a viscosity-adjusting agent, a surface tension-adjusting agent, a moistening agent, a specific resistance-adjusting agent, a coating-forming agent, an ultraviolet radiation-absorbing agent, an antioxidizing agent, an antifading agent, a rustproofing agent, and an antiseptic agent, depending on the purpose to improve various types of performance such as the discharge stability, the adaptability with respect to the printing head and the ink cartridge, the storage stability, the image storage performance, and other properties.

When the water base ink for ink-jet recording of the present invention is used for the ink-jet system of the type in which the ink is jetted in accordance with the action of the thermal energy, the thermal physical values including, for example, those of the specific heat, the coefficient of thermal expansion, and the coefficient of thermal conductivity are adjusted in some cases.

The problem involved in the conventional technique is sufficiently solved in the water base ink for ink-jet recording of the present invention. The water base ink for ink-jet recording of the present invention exhibits the satisfactory jetting stability during the normal use, and the ink is successfully restored to give a normal jetting state even under an abnormal condition, for example, when the ink is left to stand without any nozzle cap.

The present invention will be explained in further detail below with reference to Examples. However, the present invention is not limited to only Examples.

EXAMPLES 1 TO 5

Compositions shown in Table 1 were subjected to mixing and agitation to prepare black inks. The black inks of Examples 4 and 5 based on the use of carbon black were filtrated with a membrane filter of 0.8 μm after the mixing and the agitation. The black inks of Examples other than the above were filtrated with a membrane filter of 0.2 μm.

TABLE 1

| Material used | Ex. 1 | Ex. 2 | Ex. 3 | Ex. 4 | Ex. 5 |
|---|---|---|---|---|---|
| Pure water | 68 | 72 | 72 | 70 | 68 |
| Direct Black 19 | 4.5 | 4 | — | — | — |
| Food Black 2 | 3.5 | 3 | 4 | — | — |
| Carbon black | — | — | — | 5 | 6 |
| Triethylene glycol monobutyl ether | 5.7 | 4.8 | 1.9 | 1.9 | 3 |
| Triethylene glycol monomethyl ether | — | — | 6 | 6 | 1 |
| Diethylene glycol | 6 | 2 | 8 | 5 | — |
| Glycerol | 12 | 14 | 8 | 12 | 22 |
| Polyoxyethylene alkylamine | 0.2 | 0.2 | — | — | — |
| Antiseptic agent (Proxel XL-2) | 0.1 | — | 0.1 | 0.1 | — |

(unit: % by weight)

EXAMPLES 6 TO 8

Compositions shown in Table 2 were subjected to mixing and agitation to prepare yellow inks. The yellow inks were filtrated with a membrane filter of 0.2 μm after the mixing and the agitation.

TABLE 2

| Material used | Ex. 6 | Ex. 7 | Ex. 8 |
|---|---|---|---|
| Pure water | 68 | 63 | 59 |
| Direct Yellow 86 | 0.5 | — | — |
| Direct Yellow 132 | 2.0 | — | 4 |
| Acid Yellow 23 | — | 1.5 | — |
| Triethylene glycol monobutyl ether | 5 | 7 | 1 |
| Triethylene glycol monomethyl ether | — | 1.4 | 5 |
| Diethylene glycol | 4.4 | — | 8 |
| Glycerol | 14 | 27 | 15 |
| Polyethylene glycol | 6 | — | 8 |
| Antiseptic agent (Proxel XL-2) | 0.1 | 0.1 | — |

(unit: % by weight)

EXAMPLES 9 to 13

Compositions shown in Table 3 were subjected to mixing and agitation to prepare magenta inks. The magenta inks were filtrated with a membrane filter of 0.2 μm after the mixing and the agitation.

TABLE 3

| Material used | Ex. 9 | Ex. 10 | Ex. 11 | Ex. 12 | Ex. 13 |
|---|---|---|---|---|---|
| Pure water | 63 | 63 | 61 | 56 | 68 |
| Acid Red 52 | 1.5 | 0.7 | — | — | — |
| Acid Red 289 | — | 0.5 | — | — | — |
| Basic Red 1 | — | — | — | 0.5 | 0.5 |
| Basic Violet 11:1 | — | — | — | 0.4 | 0.4 |
| Direct Violet 48 | 0.5 | — | 2.5 | — | — |
| Triethylene glycol monobutyl ether | 2 | 8.7 | 4.5 | 8.1 | — |
| Triethylene glycol monomethyl ether | 2 | — | 2 | — | 5 |
| Diethylene glycol | 4.8 | — | — | — | 6.1 |
| Glycerol | 26 | 27 | — | — | — |
| 2-Pyrrolidone | — | — | 10 | 20 | — |
| Polyethylene glycol | — | — | 20 | 15 | 20 |
| Antiseptic agent (Proxel XL-2) | 0.2 | 0.1 | — | — | — |

(unit: % by weight)

EXAMPLES 14 TO 18

Compositions shown in Table 4 were subjected to mixing and agitation to prepare cyan inks. The cyan inks were filtrated with a membrane filter of 0.2 μm after the mixing and the agitation.

TABLE 4

| Material used | Ex. 14 | Ex. 15 | Ex. 16 | Ex. 17 | Ex. 18 |
|---|---|---|---|---|---|
| Pure water | 62 | 65 | 60 | 53 | 63 |
| Direct Blue 199 | 2.5 | — | — | 2 | 2 |
| Acid Blue 9 | — | 2 | 3 | 3 | — |
| Triethylene glycol monobutyl ether | 4 | — | 2 | 5 | 8 |
| Triethylene glycol monomethyl ether | 1.2 | 7.9 | 6.8 | 2 | 2 |
| Diethylene glycol | 5 | — | 10 | 4 | 5 |
| Glycerol | 25 | 25 | — | — | 20 |
| 2-Pyrrolidone | — | — | — | 10 | — |
| Polyethylene glycol | — | — | 18 | 20 | — |
| Polyvinyl pyrrolidone | — | — | — | 1 | — |
| Polyoxyethylene alkylamine | 0.2 | — | 0.2 | — | — |
| Antiseptic agent (Proxel XL-2) | 0.1 | 0.1 | — | — | — |

(unit: % by weight)

Comparative Examples 1 to 5

Compositions shown in Table 5 were subjected to mixing and agitation to prepare inks. The inks were filtrated with a membrane filter of 0.2 μm after the mixing and the agitation.

TABLE 5

| Material used | Comp. Ex. 1 | Comp. Ex. 2 | Comp. Ex. 3 | Comp. Ex. 4 | Comp. Ex. 5 |
|---|---|---|---|---|---|
| Pure water | 68 | 63 | 56 | 60 | 63 |
| Food Black 2 | 10 | — | — | — | — |
| Acid Red 52 | — | 10 | 7 | — | — |
| Acid Blue 9 | — | — | — | 5 | 6 |
| Triethylene glycol monobutyl ether | 1 | 2 | 2 | 2 | 2 |
| Triethylene glycol monomethyl ether | — | — | — | — | 1 |
| Diethylene glycol | — | 1.9 | 3 | 2 | — |
| Glycerol | 20 | 23 | 32 | — | 28 |
| 2-Pyrrolidone | — | — | — | 60 | — |
| Polyethylene glycol | — | — | — | 20 | — |
| Polyvinyl pyrrolidone | 0.9 | — | — | 5 | — |
| Antiseptic agent (Proxel XL-2) | 0.1 | 0.1 | — | — | — |

(unit: % by weight)

Evaluation

The inks prepared in Examples 1 to 18 and Comparative Examples 1 to 5 were evaluated as follows for (1) saturation viscosity, (2) deposit, and (3) nozzle restoration performance. Results are shown in Table 6.

(1) Saturation viscosity: Fifty (50) g of each of the inks prepared in Examples 1 to 18 and Comparative Examples 1 to 5 was weighed and put in a glass bottle, which was stored in a constant humidity thermostatic chamber at a temperature of 60° C. and a humidity of 40% without any cap. After that, the weight was measured every 1 day. The ink residual liquid was obtained, on condition that the point of time, at which the amount of change in weight was not more than 0.05 g, was regarded as a point of time of disappearance of weight change. The ink residual liquid was cooled to a temperature of 25° C while maintaining the humidity of 40%. The viscosity of the ink residual liquid at 25° C. was measured with a viscometer, which was regarded as the saturation viscosity.

(2) Deposit: The internal situation of the ink residual liquid was observed with a microscope to make evaluation in accordance with the following criterion. +: no deposit was confirmed at all. ±: a slight amount of deposit was confirmed. −: a large number of deposits were confirmed.

(3) Nozzle restoration performance: Recording was performed by using each of the inks prepared in Examples 1 to 18 and Comparative Examples 1 to 5 with an ink-jet recording apparatus having a multi-head of the on-demand type (discharge orifice diameter: 40 μm: driving voltage: 30 V, frequency: 10 kHz, 64 channels) to perform the recording by generating liquid droplets by applying the pressure based on the piezoelectric element vibration to the ink in the recording head. The presence or absence of discharge failure was evaluated in accordance with the following criterion after being left to stand for 14 days at 40° C. without any nozzle cap. When the discharge failure was caused, the restoration performance based on the purge was further evaluated in accordance with the following criterion. The criterion for the presence or absence of discharge failure is as follows. ++: no charge failure was observed at all. +: discharge failure was observed for 1 to 19 channels of 64 channels. ±: discharge failure was observed for 20 to 31 channels of 64 channels. −: discharge failure was observed for not less than 32 channels of 64 channels. The criterion for restoration performance is as follows. *: restoration performance was not evaluated, because no discharge failure was observed. +: discharge failure was restored by one time of purge. ±: discharge failure was restored by two or three times of purge. −: discharge failure was not restored even by three times of purge.

TABLE 6

| Example No. | Amount of water (% by weight) | Saturation viscosity (mPa · s) | Deposit | Discharge failure | Restoration performance |
|---|---|---|---|---|---|
| Example 1 | 68 | 1100 | + | ± | ± |
| Example 2 | 72 | 2900 | ± | ± | ± |
| Example 3 | 72 | 630 | + | + | + |
| Example 4 | 70 | 200 | + | + | + |
| Example 5 | 68 | 2100 | + | ± | ± |
| Example 6 | 68 | 150 | + | ++ | * |
| Example 7 | 63 | 160 | + | ++ | * |
| Example 8 | 59 | 290 | ± | ± | ± |
| Example 9 | 63 | 280 | + | + | ± |
| Example 10 | 63 | 200 | + | ++ | * |
| Example 11 | 61 | 55 | + | + | + |
| Example 12 | 56 | 30 | + | ++ | * |
| Example 13 | 68 | 30 | + | ++ | * |
| Example 14 | 62 | 320 | + | + | ± |
| Example 15 | 65 | 250 | + | + | + |
| Example 16 | 60 | 80 | + | ++ | * |
| Example 17 | 53 | 280 | ± | ± | ± |
| Example 18 | 63 | 120 | + | ++ | * |
| Comp. Ex. 1 | 68 | 3200 | − | − | − |
| Comp. Ex. 2 | 63 | 2500 | ± | ± | − |
| Comp. Ex. 3 | 56 | 2100 | ± | − | − |
| Comp. Ex. 4 | 60 | 1200 | ± | ± | − |
| Comp. Ex. 5 | 63 | 1900 | ± | ± | − |

FIG. 4 shows the relationship between the amount of water and the saturation viscosity of the ink prepared in each of Examples 1 to 18 and Comparative Examples 1 to 5. According to the result shown in FIG. 4, it is appreciated that the saturation viscosity differs even when the amount of water contained in the ink is identical, probably for the following reason. That is, it is considered that the difference in saturation viscosity relates to the difference, for example, in water-moistening performance and vapor pressure of the organic solvent, caused by the difference in structure and chemical property of the water-soluble organic solvent contained in the ink. Further, it is appreciated that the result, which is obtained when the ink-jet recording is performed, differs even when the saturation viscosity of the ink is identical. According to the result shown in FIG. 4, it is appreciated that the ink is discharged satisfactorily on condition that the saturation viscosity is disposed under the straight line represented by $4.5e^{0.09X}$, i.e., on condition that the expression (1), which is the empirical rule derived from this range, is satisfied. Further, it is appreciated that the ink is discharged more satisfactorily on condition that the saturation viscosity is disposed under the straight line represented by $2.0e^{0.09X}$, i.e., on condition that the expression (2), which is the empirical rule derived from this range, is satisfied. Therefore, it is revealed that the ink, which satisfies the empirical expression $Y \leq 4.5e^{0.09X}$ or $Y \leq 2.0e^{0.09X}$, is the ink to be preferably used for the ink-jet recording.

As shown in Table 6 and FIG. 4, any one of the inks prepared in Examples 1 to 18 satisfied the expression (1) described above. Although any deposit was partially confirmed after the evaporation of volatile components such as water in the ink or any discharge failure was observed at the multi-head, the restoration was successfully effected by means of the purge within three times in any case. Taking, for example, the stable discharge and the durability into consideration, the ink, which satisfied the expression (2), was more preferred. On the contrary, any one of the inks prepared in Comparative Examples 1 to 5 did not satisfy the expression (1) and the expression (2). The discharge failure was observed in any case, and the restoration was not effected even after three times of the purge. As for the general ink-jet recording apparatus, any merchandise, in which no restoration is made within three times of the purge, is not marketable. Therefore, the inks prepared in Comparative Examples 1 to 5 are hardly put to practical use.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
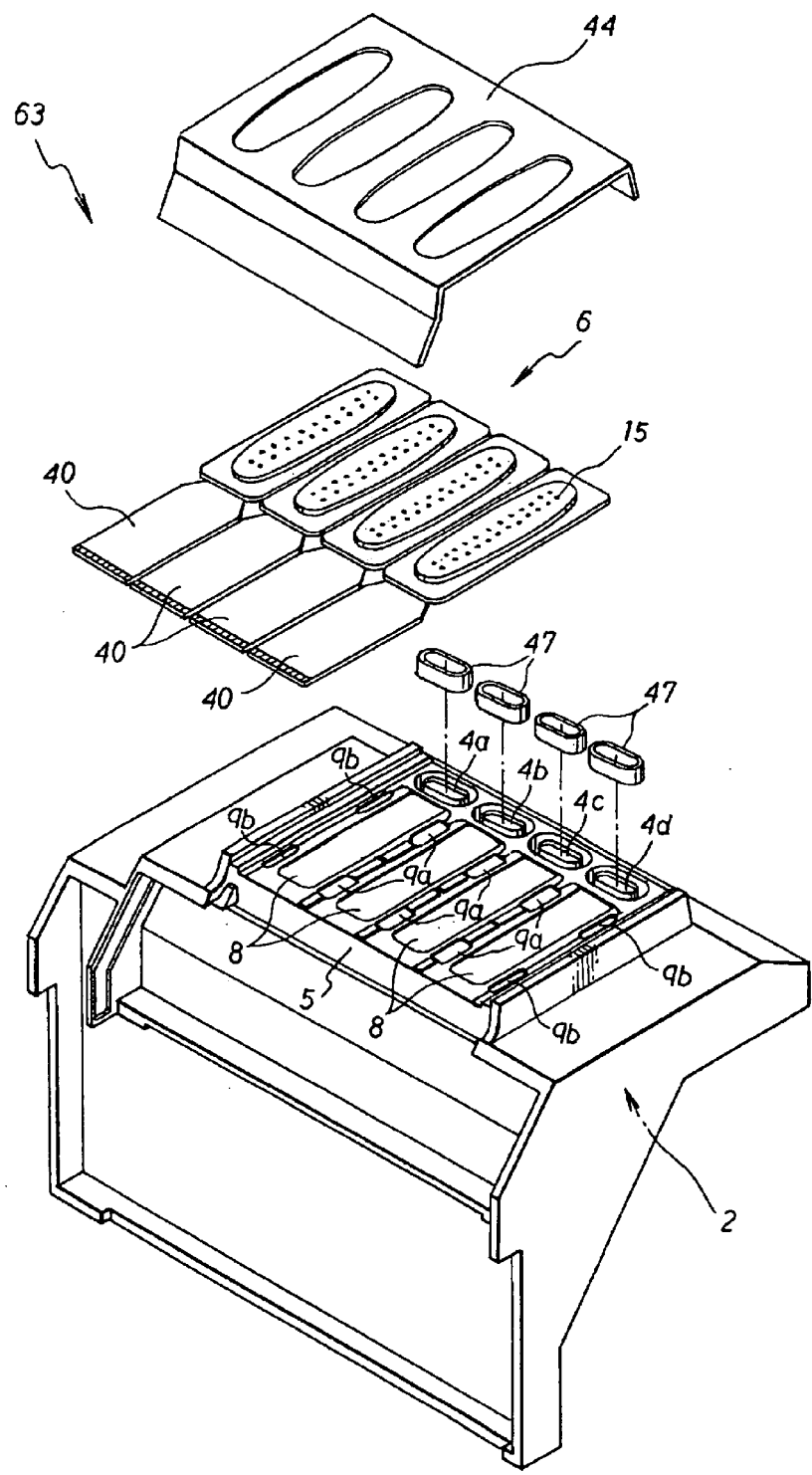
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
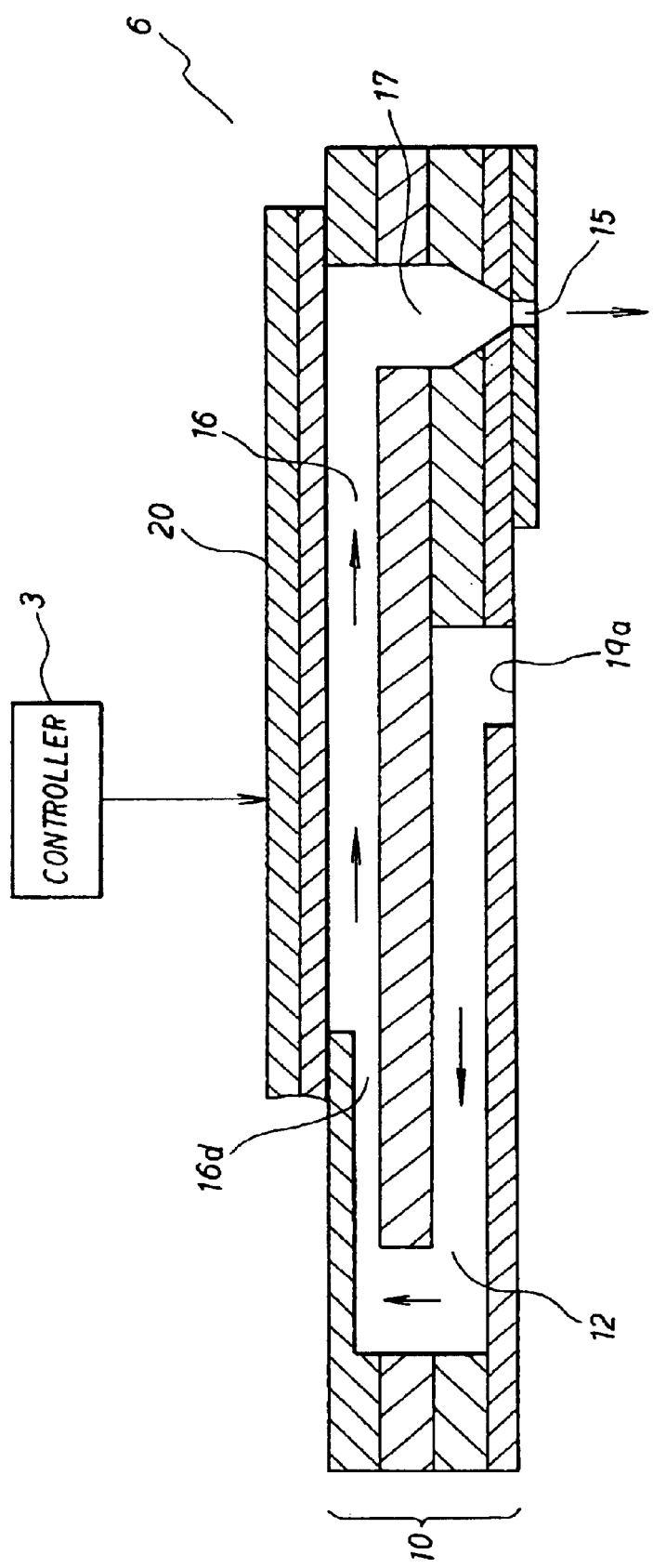
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 and 6,460,959. Further, the detailed structure of the printer and controlling method of the head unit are also disclosed in these U.S. patents, a content of which has been incorporated herein by reference.

The ink of the present invention exhibits the satisfactory jetting stability during the normal use, and the ink is easily restored to give the normal jetting state even under an abnormal condition, for example, when the ink is left to stand without any nozzle cap. Therefore, the ink-jet recording apparatus, which accommodates the ink of the present invention, makes it possible to always maintain the satisfactory jetting state.

What is claimed is:

1. An ink for ink-jet recording, which contains water, wherein an amount of water X (% by weight) in the ink and a saturation viscosity Y satisfy the following expression:

$$Y \leq 4.5e^{0.09X}$$

wherein the saturation viscosity Y is a viscosity (mPa·s) obtained when an ink residual liquid, which is obtained by evaporating volatile components of the ink until a change in weight of the ink is less than 0.05 g/day per 50 g of ink under a condition of a temperature of 60°C. and a humidity of 40%, is cooled to a temperature of 25°C. in an environment of a humidity of 40%, and X satisfies $50 \leq X \leq 75$.

2. The ink according to claim 1, wherein $Y \leq 2.0e^{0.09X}$ is satisfied.

3. The ink according to claim 1, further comprising a water-soluble organic solvent and a coloring agent.

4. The ink according to claim 1, wherein the amount of water in the ink is 55 to 73% by weight.

5. The ink according to claim 1, wherein the ink contains a water-soluble organic solvent by 10 to 45% by weight and a coloring agent by 0.1 to 5.5% by weight.

6. An ink-jet recording apparatus comprising:
an ink-jet head;
an ink tank which accommodates an ink to be supplied to the ink-jet head; and
an ink which is accommodated in the ink tank, wherein the ink contains water, wherein an amount of water X (% by weight) in the ink and a saturation viscosity Y satisfy the following expression:

$$Y \leq 4.5e^{0.09X}$$

wherein the saturation viscosity Y is a viscosity (mPa·s) obtained when an ink residual liquid, which is obtained by evaporating volatile components of the ink until a change in weight of the ink is less than 0.05 g/day per 50 g of ink under a condition of a temperature of 60°C. and a humidity of 40%, is cooled to a temperature of 25°C. in an environment of a humidity of 40%, and X satisfies $50 \leq X \leq 75$.

7. The ink-jet recording apparatus according to claim 6, wherein the ink tank is a replaceable ink cartridge.

* * * * *